United States Patent Office 3,112,348
Patented Nov. 26, 1963

3,112,348
STABILIZATION OF CHLORINATED HYDRO-
CARBON SOLVENTS
Donald H. Campbell, Niagara-on-the-Lake, Ontario,
Canada, assignor to Hooker Chemical Corporation,
Niagara Falls, N.Y., a corporation of New York
No Drawing. Filed July 19, 1961, Ser. No. 125,278
7 Claims. (Cl. 260—652.5)

This invention relates to the stabilization of chlorinated hydrocarbon solvents, such as trichloro- and perchloroethylenes. More particularly, this invention relates to the stabilization of trichloroethylene against the major types of solvent decomposition occurring in the industrial uses of this material, especially in metal degreasing. Accordingly, this invention will be explained using trichloroethylene and metal cleaning as the illustrative embodiments so that it may be more readily understood.

Trichloroethylene is widely used in industry for a number of purposes, some of which are: as a vapor degreasing solvent, as a solvent in ultrasonic cleaners, as a thinner for paints, as a freezing point depressant in fire extinguishing fluids, as a solvent in the application of phosphate coatings to metals, as an extraction solvent for vegetable oils, and as a heat transfer medium. Trichloroethylene itself is a reactive chemical and in many of the uses of this material, it is exposed to air, light, heat, a variety of metals often in finely divided state with reactive surfaces, and a great many other reactive materials. Therefore, before trichloroethylene can be utilized in many of these applications, it must be stabilized by the addition of minor amounts of compounds which inhibit the decomposition of the trichloroethylene under its conditions of use. For example, when trichloroethylene is to be used as the solvent in the vapor degreasing process for cleaning metals, the conditions affecting solvent stability vary greatly from one degreasing operation to another and some of the factors influencing solvent stability call for much more stable solvents then generally provided in commercially available trichloroethylene. Thus, one may successfully and repetitively degrease the more inert metals, e.g. stainless steel, with solvent of average stability but extensive decomposition can occur when the same solvent is repetitively used for the degreasing of aluminum parts where there are large quantities of aluminum turnings and fines to be removed along with other extraneous materials. The very large surface area and highly active surfaces of the metal fines, coupled with their tendency to build up around the heating coils of the degreaser to cut down solvent circulation and provide "hot-spots," all cause a severe strain on the stabilizing system of the trichloroethylene, and thereby deleteriously affect its satisfactory, efficient and continued use in the degreasing process.

The use of trichloroethylene as a paint thinner in paints such as in the hot dip paint process (United States Patents 2,515,489; 2,728,686; 2,728,952; 2,739,567; 2,783,165) or the flowcoat process (United States Patent 2,861,897) presents further problems in that the trichloroethylene is kept hot and in contact with metals and exposure to the many constituents of paints, such as the resins, driers, pigments including metal pigments, extender pigments, etc., over an extended period of time, thereby deleteriously affecting its satisfactory, efficient and continued use in these processes.

Other uses of trichloroethylene present similar problems in that the conditions of use are such as to require careful stabilization if decomposition of the trichloroethylene is to be avoided.

The exact mechanism by which the trichloroethylene breaks down is not known, but it is generally considered that the major decomposition reactions are oxidation and metal catalyzed condensations. It is known that oxidation of the trichloroethylene by oxygen, which may be catalyzed by light or heat causes the formation of a small proportion of hydrogen chloride. When a metal such as aluminum or iron is contacted with partially oxidized trichloroethylene, hydrochloric acid reacts with the metal to form the corresponding metal chloride. The metal chloride causes condensation of trichloroethylene, which yields additional hydrochloric acid to react with the metal. Thus it can be seen that if oxidation is inhibited, there is less likelihood of a metal salt forming by the reaction of oxidation products with the metal, and thus less likelihood of the condensation reaction occurring. The exothermic nature of these reactions can be sufficient to cause residual oils in the degreaser solution to ignite, and this in addition to the formation of hydrogen chloride creates a serious hazard to personnel and equipment. In addition, these reactions markedly reduce the efficiency of the degreasing operation.

It is an object of this invention to provide an improved method of stabilizing chlorinated hydrocarbon solvents.

It is a further object to stabilize trichloroethylene against the major types of decomposition reactions that take place under severe use conditions.

Still a further object of the invention is to stabilize trichloroethylene against decomposition by oxidation.

Another object of the invention is to stabilize perchloroethylene against major types of decomposition reactions that take place under severe use conditions.

It is another object of the invention to stabilize perchloroethylene against decomposition by oxidation.

These and other objects of the invention will be apparent from the following detailed description.

I have now discovered that triethyl phosphine is markedly effective in stabilizing chlorinated hydrocarbons such as trichloroethylene and perchloroethylene against decomposition by oxidation.

The proportion of triethyl phosphine necessary to effect stabilization of the chlorinated hydrocarbon, which is designated as the ""stabilizing proportion"" throughout the description and claims, may be between about 0.005 and about 1.0 percent, and preferably between about 0.02 and about 0.5 percent by weight of the chlorinated hydrocarbon. When proportions of stabilizer greater than 1.0 percent are employed, the degree of stabilization increases as the proportion of stabilizer is increased. However, satisfactory stabilization is effected with proportions less than about 1.0 percent by weight. I have also found that the presence of other additives such as those presently used in trichloroethylene designated by the industry as ""MD"" or metal degreasing grade, does not interfere with the stabilizing action of the triethyl phosphine, but may, in fact, enhance the stabilizing power by synergistic action.

The following test procedure was devised to evaluate the stabilities of trichloroethylene samples under conditions which simulate the conditions at the onset of decomposition. To accelerate the test such that it occurs within a practical length of time for evaluation, the trichloroethylene samples were tested for four hours at reflux temperatures in the presence of a minor amount of powdered iron in an oxygen atmosphere. In most uses of trichloroethylene, major causes of decomposition are due to metal catalysts or oxidation. Powdered iron was added to these samples since it forms iron chloride, a vigorous metal catalyst in the decomposition of trichloroethylene. The oxygen was added to enhance decomposition of the trichloroethylene by oxidation.

Dry oxygen was metered into each of the test flasks, which were five hundred milliliters Erlenmeyer flasks with side inlet tubes extending to within one-eighth inch to one-quarter inch from the bottom. The flasks were mounted on small hot plates placed around and equidistant from a one hundred watt ultraviolet lamp and were surmounted"

by modified Soxhlet extractors (siphon action prevented by connection to body of extractor) containing fifty milliliters of distilled water (pH 7) and fitted with reflux condensers.

The trichloroethylene samples were placed in the flasks along with powdered iron. Oxygen was passed through each flask and the contents heated under reflux for four hours. The evolved HCl was absorbed in the water in the modified extractor, a process aided by the scrubbing of the liquid during its return to the flask. The total amount HCl formed was determined by titration of aliquots of the contents of the test flask and the extractor with 0.01 N potassium hydroxide solution. Since HCl is the major decomposition product, the greater the amount of HCl evolved, the greater the decomposition of trichloroethylene.

The following example is presented to define the invention more fully without any intention of being limited thereby. All parts and percentages are by weight unless otherwise specified.

*Example*

Trichloroethylene (two hundred milliliters), triethyl phosphine (one milliliter) and powdered iron (0.1 gram) were placed in a test Erlenmeyer flask and heated under reflux for four hours. During this period oxygen was bubbled through the trichloroethylene at a rate of between about one and about three milliliters per minute. The refluxed trichloroethylene was passed from the reflux condenser through a modified Soxhlet extractor containing about fifty milliliters of distilled water before returning to the flask. At the end of the test aliquots of extraction water and the trichloroethylene were titrated for HCl with 0.01 N potassium hydroxide solution. The combined hydrochloric acid content was equivalent to about 0.087 milliliter of 1 N HCl.

For purposes of comparison the procedure was repeated, with the exception that no triethyl phosphine was added to the trichloroethylene. The HCl content of the water and trichloroethylene produced in this test was equivalent to an average of about three milliliters of 1 N HCl. Thus it can be seen that the novel stabilizers of the instant invention markedly inhibit decomposition of trichloroethylene.

Triethyl phosphine, when admixed and heated with chlorinated hydrocarbons such as trichloroethylene and perchloroethylene, is essentially coboiling with the hydrocarbon. This characteristic is a marked advantage in degreasing operations where the chlorinated hydrocarbon is vaporized, condensed, and recycled to the degreasing solution. Under these conditions the triethyl phosphine stabilizer is carried with the chlorinated hydrocarbon, thereby maintaining the stability thereof throughout the cycle.

Various modifications and ramifications of this invention will occur to those skilled in the art upon a reading of a description of this invention. These modifications are intended to be encompassed within the scope of this invention, and I do not wish the invention to be limited except as defined by the appended claims.

I claim:

1. A composition comprising a chlorinated hydrocarbon solvent selected from the group consisting of trichloroethylene and perchloroethylene and a stabilizing proportion of triethyl phosphine.

2. The composition of claim 1 wherein said chlorinated hydrocarbon solvent is trichloroethylene.

3. The composition of claim 1 wherein said chlorinated hydrocarbon solvent is perchloroethylene.

4. The composition of claim 1 wherein the proportion of said triethyl phosphine is between about 0.005 and about 1.0 percent by weight of said chlorinated hydrocarbon solvent.

5. The composition of claim 1 wherein the proportion of said triethyl phosphine is between about 0.02 and about 0.5 percent by weight of said chlorinated hydrocarbon solvent.

6. A composition comprising trichloroethylene and triethyl phosphine in a proportion between about 0.005 and about 1.0 percent by weight of said trichloroethylene.

7. The composition of claim 6 wherein the proportion of said triethyl phosphine is between about 0.02 and about 0.5 percent by weight of said trichloroethylene.

References Cited in the file of this patent

UNITED STATES PATENTS

| | | |
|---|---|---|
| 2,917,554 | McDonald et al. | Dec. 15, 1959 |
| 2,970,113 | Bachtel | Jan. 31, 1961 |
| 2,975,219 | Starks | Mar. 14, 1961 |